G. E. PRATT.
CAR WHEEL AND MEANS FOR MOUNTING THE SAME.
APPLICATION FILED APR. 1, 1920.

1,366,211.

Patented Jan. 18, 1921.

WITNESSES

INVENTOR
GEORGE E. PRATT,
BY
ATTORNEYS

UNITED STATES PATENT OFFICE.

GEORGE EDWARD PRATT, OF CANON CITY, COLORADO.

CAR-WHEEL AND MEANS FOR MOUNTING THE SAME.

1,366,211.  Specification of Letters Patent.  Patented Jan. 18, 1921.

Application filed April 1, 1920. Serial No. 370,363.

*To all whom it may concern:*

Be it known that I, GEORGE EDWARD PRATT, a citizen of the United States, and resident of Canon City, in the county of Fremont and State of Colorado, have invented a new and Improved Car-Wheel and Means for Mounting the Same, of which the following is a full, clear, and exact description.

In connection with car wheels, and the mounting of the same, it is well appreciated that a great many axles wear out, in that a large amount of wear occurs at this part of the car. These axles are expensive to manufacture in that the same are machined, adjacent their ends so as to provide a proper bearing.

The method of oiling axle bearings has left much to be desired, in that numerous "hot-boxes" occur which often progress to a point where irreparable damage is done to the bearing before the engine driver is aware of the same.

Having the defects in mind, I have constructed a car wheel and method of mounting the same to an axle, which is particularly designed for use in connection with small cars, such as mining cars, but which may be readily designed so as to meet the requirements to which the same would be subjected when applied to a larger type of car.

An object of my invention is the construction of an axle upon which the wheels are mounted, and which will have a life equally as long as that of the frame of the car, and which will further not have to be machined.

A further object of my invention is the construction of a bearing which may be readily and cheaply renewed and which bearing will receive the entire wear.

A still further object of the invention is the provision of a certain construction which will provide an adequate oiling.

Other objects of my invention will appear in the annexed specification and drawings, which latter illustrate one practical embodiment of my invention, and in which—

Figure 1:
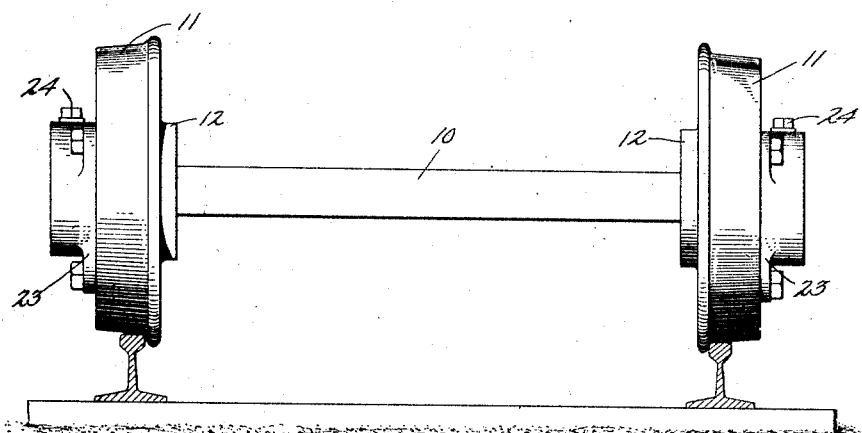
Figure 1 illustrates an axle constructed in accordance with my invention, and having applied thereto wheels designed in accordance with the same.
Figure 2:
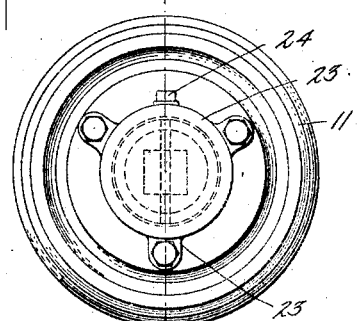
Fig. 2 is a side view of a wheel embodying my improved construction in assembled condition.
Figure 3:
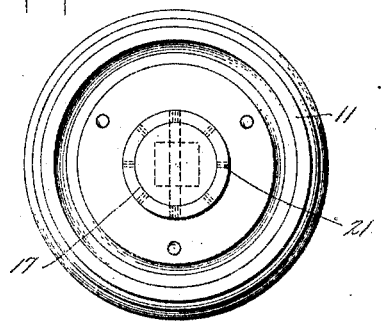
Fig. 3 illustrates the same with the oil cap removed.
Figure 4:
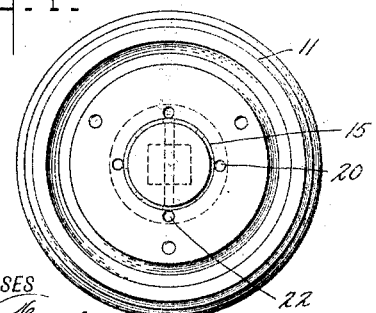
Fig. 4 shows the wheel with the pin and retaining collar eliminated.

In all these views like reference numerals designate similar parts, and the reference numeral 10 indicates an axle which is preferably constructed of a square piece of iron or steel. A wheel 11 of conventional cast iron construction is associated with each end of the axle 10, and is secured in this position by means of a construction hereinafter more fully described.

The wheel 11 is conveniently formed in its rear face with an annular outwardly extending flange 12, and a bushing such as 13 formed with an outwardly extending flange 14 adjacent one of its ends is mounted upon the axle 10, it being noted that the flange 14 coöperates with the inner face of the flange 12 of the car wheel 11, whereby to form a guide to prevent outward movement of the car wheel 11 along the axle 10.

Interposed between the bore of the car wheel 11 and the face of the bushing 13, and mounted upon the latter is a bushing such as 15 preferably constructed of a piece of case hardened steel tubing.

It is to be noted that a collar 17 is provided, which collar is retained in applied position by virtue of a pin or other securing member passing transversely through the same, the bushing 13 and the axle 10. This collar as may well be appreciated, bears against the outer edge and face of the bushing 15 and the wheel 11 respectively, thus serving to retain these elements in applied position.

From the above it will be seen that I have constructed a car wheel in which the axle will not be subject to wear to the slightest degree, and which axle will not have to be machined as is now the case.

It will be further understood that the steel bushing will outwear several cast iron bushings, and that these parts wearing against one another provide an extremely good bearing. It will also be appreciated that the cast iron bushings may be cheaply manufactured and easily replaced so that the wheel will always run true.

Figure 5:
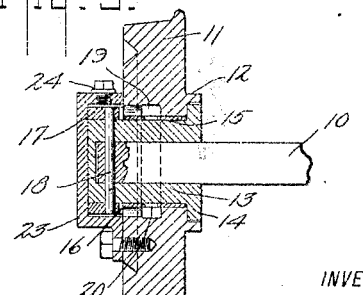
Fig. 5 is a sectional side view taken along the lines 5—5 of Fig. 2.

Now with a view of providing adequate lubrication, it will be noted, reference being had to Fig. 5, that the bore of the wheel 10 is enlarged as has been indicated by the reference 19, throughout a portion of its length, and that the bushing 15 is formed with openings such as 20 through its body by means of which lubricant may pass underneath the bushing 15 to a position between the same and the bushing 13.

It will also be noted the collar 17 is formed with a series of grooves 21 in its inner face, and adjacent its edge, which grooves, when the wheel is turning, will be almost constantly in communication with certain of the openings 22 formed in the outer face of the wheel 11, these latter openings in turn communicating with the enlarged bore 19 of said wheel.

An oil cap 23 is now applied to the outer face of the car wheel 11, and encircles the collar 17, its inner face being spaced from the outer face of said collar, as has been clearly shown in Fig. 5. The oil retaining cap is also conveniently provided with a filling plug 24 which may be readily removed, and by means of which oil may be introduced between all of the moving parts of my improved construction so as to provide adequate lubrication.

Obviously numerous modifications of structure might be resorted to without in the least departing from the scope of my claims.

What I claim as new and desire to secure by Letters Patent is as follows:—

A car wheel, and a mounting, including a bushing, a car wheel formed with an enlarged bore adapted to encircle said bushing, a second bushing formed with openings through its body adapted to be interposed between said wheel and bushing, and contacting with the same adjacent its enlarged bore, a collar secured to said first named bushing, and bearing against the outer face of said car wheel, and an oil cap secured to said car wheel, and adapted to encircle said collar, the said collar and car wheel being formed with openings permitting a flow of fluid from said cap into the enlarged bore and between the bushings.

GEORGE EDWARD PRATT.